US005672650A

United States Patent [19]

Yagi

[11] Patent Number: 5,672,650
[45] Date of Patent: Sep. 30, 1997

[54] VINYL CHLORIDE RESIN COMPOSITION

[75] Inventor: Keisuke Yagi, Takatsuki, Japan

[73] Assignee: Sumitomo Bakelite Company Limited, Tokyo, Japan

[21] Appl. No.: 555,472

[22] PCT Filed: Dec. 7, 1989

[86] PCT No.: PCT/JP89/01227

§ 371 Date: Aug. 8, 1990

§ 102(e) Date: Aug. 8, 1990

[30] Foreign Application Priority Data

| Jun. 8, 1988 | [JP] | Japan | 63-139380 |
| Jun. 8, 1988 | [JP] | Japan | 63-139381 |
| Jun. 8, 1988 | [JP] | Japan | 63-139382 |

[51] Int. Cl.$^6$ .................................................. C08L 67/00
[52] U.S. Cl. ........................................ 524/513; 524/569
[58] Field of Search ................................ 524/513, 569

[56] References Cited

U.S. PATENT DOCUMENTS 3,718,715 2/1973 Crawford et al. .................. 260/873
4,340,550 7/1982 Higashiguchi et al. ............. 524/515

FOREIGN PATENT DOCUMENTS

| 0390060 | 3/1990 | European Pat. Off. . |
| 2138095 | 5/1972 | France . |
| 62-104860 | of 1987 | Japan . |
| 62-265339 | of 1987 | Japan . |
| 62-48751 | of 1987 | Japan . |
| 1311153 | 12/1989 | Japan . |
| 1354826 | 5/1972 | United Kingdom . |

OTHER PUBLICATIONS

Rogozinsky, Kramer, "Determination of the Gel Content of Vinyl Chloride Polymers and Copolymers", *Journal of Polymer Science: Polymer Chemistry Edition*, vol. 10, pp. 3111-3112, 1972.

Primary Examiner—Peter D. Mulcahy
Attorney, Agent, or Firm—Browdy and Neimark

[57] ABSTRACT

A vinyl chloride resin composition providing a rubbery elastic material small in temperature dependence of hardness which is composed mainly of 100 parts by weight of a vinyl chloride resin comprising 8-90% by weight of a tetrahydrofuran-insoluble gel fraction and the remainder of a tetrahydrofuran-soluble fraction, 10-200 parts by weight of a copolyester resin and 25-200 parts by weight of a plasticizer, and tubes and curl cords obtained using the composition.

7 Claims, No Drawings ized rubbers, the temperature-dependent difference of hardness (JIS K 6301A type) is about 10 in the range of −20° C. to 80° C. and thus the temperature dependence of hardness is small. In the case of general non-rigid vinyl chloride resins, the hardness temperature dependence shows a high value of about 40 making these resins generally inferior in temperature dependence of hardness. In order to reduce temperature dependence of hardness, use of a vinyl chloride resin containing a gel fraction has been considered, but temperature-dependent difference of hardness (JIS K 6301A type) 1 has been improved only by about 5 in the range of −20° C. to 80° C. as compared with general non-rigid vinyl chloride resins.

VINYL CHLORIDE RESIN COMPOSITION

TECHNICAL FIELD

The present invention relates to a vinyl chloride resin composition which provides a rubbery elastic material having a hardness only slightly dependent on temperature, and it also relates to a tube having good heat distortion resistance and high impact resilience and a matte curl cord having high impact resilience which are made by molding the above vinyl chloride resin composition.

BACKGROUND ART

In general, vinyl chloride resins have hardness values which depend greatly on temperature, i.e. their hardness varies greatly depending on the temperature. Therefore, grips and the like which are used outdoor are apt to change in touch depending on the outside temperature, and this is a severe limitation. For example, in the case of general vulcanized rubbers, the temperature-dependent difference of hardness (JIS K 6301A type) is about 10 in the range of −20° C. to 80° C. and thus the temperature dependence of hardness is small. In the case of general non-rigid vinyl chloride resins, the hardness temperature dependence shows a high value of about 40 making these resins generally inferior in temperature dependence of hardness. In order to reduce temperature dependence of hardness, use of a vinyl chloride resin containing a gel fraction has been considered, but temperature-dependent difference of hardness (JIS K 6301A type) 1 has been improved only by about 5 in the range of −20° C. to 80° C. as compared with general non-rigid vinyl chloride resins.

Rubbers are mainly employed for uses which require heat distortion resistance and high impact resilience. This is because they possess heat distortion resistance and high impact resilience which are characteristics of rubbers. However, tubes formed of rubber, require vulcanization and thus suffer from the problems that the number of operation steps increase and in addition the material cannot be recycled. In order to solve these defects of rubbers, non-rigid vinyl chloride resins or thermoplastic elastomer resins are used in some tubes, but since they are thermoplastic resins, they are low in heat distortion resistance and inferior in creep property and are limited in scope of use. A curl cord coated with a non-rigid vinyl chloride resin composition high in impact resilience which comprises a vinyl chloride resin containing a gel fraction to which a plasticizer is added, is widely used in place of urethane resin and polyester resin. However, although curl cords coated with conventional vinyl chloride resin compositions are inexpensive as compared with urethane and polyester resins and besides show no discoloration and have self-extinguishing properties, they are inferior to urethane or polyester resin-coated curl cords in impact resilience (JIS K6301, which is used also for the measurement referred to hereinafter), heat distortion degree (JIS K6723, which is used also for the measurement referred to hereinafter) and permanent compression set (JIS K6301, 70° C.×22 hr, which is used also for the measurement referred to hereinafter). Furthermore, in case of a use such as a curl cord for an automobile telephone set the body of which is small, urethane and polyester resins are too high in impact resilience, resulting in movement of the body of the telephone set, and vinyl chloride resins are too low in impact resilience and are inferior in spring back, and there have been no vinyl chloride resins having proper impact resilience. Further, for some uses, the peculiar gloss of vinyl chloride resins is unsatisfactory.

Sufficiently satisfactory solutions have not been obtained for curl cords in which the conventional vinyl chloride resin composition is used.

That is, improvement of impact resilience by conventional methods has been contemplated by using vinyl chloride resins containing a gel fraction. However, these methods have not attained sufficient improvement. Furthermore, in order to take off gloss of vinyl chloride resins, extrusion temperature must be lowered and thus productivity decreases and, generally, properties also tend to deteriorate.

With reference to improvements of the creep resistance, retention of shape at high temperature, and impact resilience of a vinyl chloride resin composition, it has been found that better creep resistance and retention of shape at high temperature as compared with those of general vinyl chloride resin compositions can be obtained by the resin composition of U.S. Pat. No. 4,340,530, namely, the composition comprising 100 parts by weight of a vinyl chloride resin consisting of 8–90% by weight of a tetrahydrofuran-insoluble polyvinyl chloride gel fraction and the remainder of a tetrahydrofuran-soluble fraction and 25–200 parts by weight of a plasticizer. However, although the above composition has an impact resilience of about 30–35% which is better than 25–28% of general non-rigid vinyl chloride resin compositions, it is inferior in impact resilience to urethane and polyester resins of 60–70% impact resilience.

Under the circumstances, the inventors have made intensive research and as a result they have found the surprising facts that molded products which are excellent in creep resistance, heat distortion resistance such as heat distortion ratio and impact resilience, which are low in temperature dependence of hardness, which have good matte effect and which are superior in processability can be obtained by adding a proper amount of a copolyester resin to the main components of the resin composition of U.S. Pat. No. 4,340,530. Thus, the present invention has been accomplished.

An object of the present invention is to provide a molded product low in temperature dependence of hardness, specifically, having a temperature dependent-difference of hardness (JIS K 6301A type) of 25 or less in the range of −20° C. to 80° C.

Another object of the present invention is to provide a curl cord coated with a vinyl chloride resin composition which is excellent in heat distortion resistances such as heat distortion ratio and permanent compression set, high in impact resilience, superior in processability and which has superior matte effect.

Further another object of the present invention is to provide a tube made by molding a vinyl chloride resin composition which has molding processability similar to that of general thermoplastic resins though it has heat distortion resistance and high impact resilience close to those of rubbers.

DISCLOSURE OF INVENTION

That is, the present invention is a vinyl chloride resin composition which provides a rubbery elastic material small in temperature dependence of hardness and which is composed mainly of 100 parts by weight of a vinyl chloride resin comprising 8–90% by weight of a tetrahydrofuran-insoluble gel fraction and the remainder of a tetrahydrofuran-soluble fraction, 10–200 parts by weight of a copolyester resin and 25–200 parts by weight of a plasticizer.

Furthermore, the present invention provides a tube having heat distortion resistance and high impact resilience which is made by molding the above vinyl chloride resin composition.

Moreover, the present invention provides a matte curl cord of high impact resilience which is characterized by being coated with the above vinyl chloride resin composition which is excellent in heat distortion resistances such as heat distortion ratio and permanent compression set, high in impact resilience, superior in processability and has good matte effect.

The characteristic of the vinyl chloride resin composition of the present invention resides in that 10–200 parts by weight, preferably 30–100 parts by weight of a copolyester resin and 25–200 parts by weight, preferably 40–150 parts by weight of a plasticizer are blended with 100 parts by weight of a gel-containing vinyl chloride resin, and this has made it possible to produce molded products low in temperature dependence of hardness. If the copolyester resin is contained in an amount of less than 10 parts by weight, temperature dependence of hardness cannot be improved, and if content of the copolyester resin exceeds 200 parts by weight, the composition sticks much to a kneader and it is not satisfactorily molten.

With reference to average polymerization degree of the tetrahydrofuran-soluble fraction of the gel-containing vinyl chloride resin, processability is improved with increase in polymerization degree. In general, average polymerization degree of 400–10000, preferably 1800–7000 is employed.

"Tetrahydrofuran-insoluble gel fraction" used in this specification and claims means an extraction residue obtained by subjecting to extraction with hot tetrahydrofuran for 22 hours by a Soxhlet' extractor and separating the extract by a 350 mesh filter.

Extrusion molding method is mainly used for obtaining tubes of ordinary shape, but it is also possible to employ injection molding, blow molding or press molding for tubes of short and special shapes. The characteristic of the tube of the present invention resides in that partially crosslinked vinyl chloride resin is blended with a copolyester resin, and thereby it has become possible to produce a tube having heat distortion resistance and high impact resilience by molding methods similar to those used for thermoplastic resins. Amount of the crosslinked portion in the vinyl chloride resin is suitably 8–90% by weight from the points of heat distortion resistance and high impact resilience and processability.

Further characteristic of the present invention resides in that there is obtained an impact resilience of about 40–50% which is close to 60–70% of a urethane or polyester resin, by coating a curl cord with a vinyl chloride resin composition composed mainly of 100 parts by weight of a vinyl chloride resin comprising 8–90% by weight of a tetrahydrofuran-insoluble polyvinyl chloride gel fraction and the remainder of a tetrahydrofuran-soluble fraction, 10–200 parts by weight of a copolyester resin and 25–200 parts by weight of a plasticizer.

For improving impact resilience, it is necessary to use at least three components, i.e., the main component consisting of the vinyl chloride resin of U.S. Pat. No. 4,340,530, 10–200 parts by weight of a copolyester resin and 25–200 parts by weight of a plasticizer. If any one of them is omitted, impact resilience cannot be close to that of a urethane or polyester resin.

When a polyvinyl chloride resin outside the scope of the present invention, namely, one which contains less than 8% by weight of a tetrahydrofuran-insoluble gel fraction, or one which contains no gel fraction is used, impact resilience cannot be improved to approximately that of a urethane or polyester resin.

In the composition of the present invention, a copolyester resin is added to improve the resulting molded product, and addition amount thereof varies depending on use object of the molded product. If amount of a copolyester resin is less than 10 parts by weight, improvement of temperature dependence of hardness cannot be attained, and if it exceeds 200 parts by weight, the composition sticks much to a kneader to deteriorate operability, and many problems occur in processability. The especially preferred range is 30–100 parts by weight and good impact resilience and processability are obtained in this range.

Examples of such copolyester resins include those which have PBT (polybutadiene terephthalate) as a hard segment and poly(alkylene oxide) glycol in which the alkylene group has 2–10 carbon atoms, as a soft segment such as poly(ethylene oxide) glycol,
poly(1,2- and 1,3-propylene oxide) glycol,
poly(tetramethylene oxide) glycol,
poly(pentamethylene oxide) glycol,
poly(hexamethylene oxide) glycol,
poly(heptamethylene oxide) glycol,
poly(octamethylene oxide) glycol,
poly(nonamethylene oxide) glycol, and
poly(1,2-butylene oxide) glycol; random or block copolymers of ethylene oxide and 1,2-propylene oxide, and polyformals prepared by reacting formaldehyde with a glycol such as propylene glycol or a glycol mixture such as a mixture of tetramethylene and pentamethylene glycols.

In the composition of the present invention, a plasticizer is added in order to impart rubbery elasticity to the resulting molded product and besides improve impact resilience, and addition amount thereof varies depending on the use object of the molded product. However, if amount of a plasticizer is too small, melting at high temperature and molding under high pressure are required and processing of the resin becomes difficult, resulting in brittle tubes of poor appearance. On the other hand, if a plasticizer is too much, there are various problems in processability and in practical use such as exudation of the plasticizer to the surface of the resulting tube to result in tackiness.

When amount of a plasticizer is less than 25 parts by weight, impact resilience decreases, and when it is more than 200 parts by weight, productivity and processability deteriorate. The especially preferred range is 40–150 parts by weight in which impact resilience and processability are superior.

As examples of such plasticizers, there are cited alkyl esters of aromatic polybasic acids such as dibutyl phthalate, dioctyl phthalate and butylbenzyl phthalate; alkyl esters of aliphatic polybasic acids such as dioctyl adipate, dioctyl azelate and dioctyl sebacate; esters of phosphoric acid such as tricresyl phosphate; and polyesters. There are no differences in impact resilience and processability for all of these plasticizers.

As the polyvinyl chloride resins used in the present invention, there may be used those which are used in U.S. Pat. No. 4,340,530, and so details thereof are omitted here, but they are characterized by comprising 8–90% by weight of a tetrahydrofuran-insoluble gel fraction and the remainder of a tetrahydrofuran-soluble fraction and include the following copolymers.

That is, as monomers copolymerizable with vinyl chloride, there are cited fatty acid vinyl esters, vinylidene halides, acrylic acid alkyl esters, methacrylic acid alkyl esters, acrylonitrile, alkylvinyl ethers, styrene, ethylene, urethane and derivatives thereof.

The vinyl chloride resin composition of the present invention can be utilized as such, but if necessary, may contain another thermoplastic resin, rubber, heat stabilizer, filler, pigment, processing aid, etc.

Other thermoplastic resins include general vinyl chloride resins, ethylene-vinyl acetate copolymer, chlorinated polyethylene, ABS resin, AS resin, urethane, acrylic resins, etc., and NBR, CR and the like are used as a rubber.

Heat stabilizers include lead type heat stabilizers such as tribasic lead sulfate; tin type stabilizers such as dibutyltin maleate; and metallic soaps such as zinc stearate, calcium stearate and barium stearate, and addition amount thereof is generally 20 parts by weight or less and can be used as required.

As fillers, there are cited carbon black, calcium carbonate, titanium oxide, talc, asbestos, aluminum hydroxide, magnesium hydroxide, etc. and these can be used as required. Amount thereof is not limited, but they are generally used in an amount of 100 parts by weight or less.

Pigments include color carbon black, chrome yellow, titanium oxide, Phthalocyanine Green, etc. and can be used depending on purpose.

Processing aids include low-molecular weight polyethylenes, higher fatty acid esters, etc. which are usually used for vinyl chloride resins.

The vinyl chloride resin composition of the present invention can be granulated by the same processes as for conventional vinyl chloride resins. That is, the composition is mixed with plasticizer, stabilizer, etc. by a mixer such as super mixer or blender and the mixture is kneaded and granulated by Banbury mixer, mixing roll, extruder, etc. Like general non-rigid vinyl chloride resins, the granulated pellets can be subjected to injection molding, extrusion molding, press molding, blow molding, calender molding, etc. and the processability is superior like non-rigid vinyl chloride resins.

It is due to the blending of a PVC containing a gel fraction with a copolyester resin that a vinyl chloride resin molded product of about 25 or less in temperature-dependent difference (in the range of −20° C. to 80° C.) of hardness (JIS K 6301A type) can be produced in commercial base according to the present invention.

Hitherto, temperature dependence of hardness of vinyl chloride resins has been considered to be inferior to that of rubbers. In order to reduce temperature dependence of hardness, normally a vinyl chloride resin containing a gel fraction has been used, but this has not improved temperature dependence of hardness so much. However, it becomes possible to produce elastic materials having a temperature-dependent difference of hardness (JIS K 6301A type) of 25 or less in the range of −20° C. to 80° C. by blending a copolyester resin with a vinyl chloride resin containing a gel fraction.

The vinyl chloride resin composition comprising a blend of a copolyester resin and a vinyl chloride resin containing a gel fraction according to the present invention can be subjected to granulation by the same process as used for conventional vinyl chloride resins. That is, the composition is mixed with a plasticizer, a stabilizer, etc. by a mixer such as super mixer, blender or the like, and the mixture is kneaded and granulated by Banbury mixer, mixing roll, extruder, or the like. The granulated pellets can be subjected to injection molding, extrusion molding, blow molding, calender molding, and press molding like general non-rigid vinyl chloride resins, and the resulting molded products have good appearance like general non-rigid vinyl chloride resins.

Other characteristics of the present invention are that cold resistance, tear strength and wear resistance can be improved as compared with general vinyl chloride resins.

The tube of the present invention is superior in processability like tubes made of general vinyl chloride resins and besides has heat distortion resistance and high impact resilience close to those of rubbers. Therefore, the present tube is used as tubes for covering iron wire such as leading tubes and tubes for piping in an engine room of an automobile, protective covering tubes for household appliances and electric wires, and tubes for construction and foods and furthermore, can also be used for transport parts the content of which is liquid, gas or solid.

The curl cord of the present invention is superior in processability and heat distortion resistance, has matte effect and is excellent in impact resilience like cords of general vinyl chloride resins.

The fact that high-temperature characteristics and low-temperature characteristics are improved by adding a copolyester resin naturally means that the curl cord is one which is covered with a vinyl chloride type thermoplastic resin which is satisfactory in creep resistance, retention of shape at high temperatures, oil resistance and heat aging resistance which is peculiar to a polyvinyl chloride type resin.

BEST MODE FOR CARRYING OUT THE INVENTION

The present invention is explained in detail by the following examples.

EXAMPLE 1

To 100 parts by weight of a vinyl chloride polymer comprising 20% of a tetrahydrofuran-insoluble gel fraction and the remainder of a tetrahydrofuran-soluble fraction having an average polymerization degree of 5000 (UX-C manufactured by Sumitomo Chemical Co., Ltd.) were added 90 parts by weight of diisononyl phthalate, 3 parts by weight of a barium-zinc type stabilizer (AP-539 manufactured by Adeka Argus Co. Ltd.) and a copolyester resin (HYTREL 4057 manufactured by Toray DuPont Co.) in various amounts. The mixture was kneaded by a Banbury mixer to make pellets.

Pressed sheets were produced from the pellets, and temperature-dependent difference of hardness (JIS K6301) of the sheets was measured in the range of −20° C. to 80° C., and the results were simultaneously compared with those of NBR, SBR, EPDM and general polyvinyl chloride. Temperature-dependent difference of hardness (JIS K6301) and productivity were evaluated in Table 1.

TABLE 1

| | Experiment No. | Addition amount of copolyester resin (part by weight) | Temperature-dependent difference of hardness (JIS K6301A type) −20° C. to 80° C. | Productivity Note (1) |
|---|---|---|---|---|
| Comparative Example | 1 (NBR) | — | 21 | — |
| | 2 (SBR) | — | 13 | — |
| | 3 (EPDM) | — | 11 | — |
| | 4 (general polyvinyl chloride) | 0 | 39 | Good |
| | 5 | 0 | 34 | Good |
| | 6 | 5 | 32 | Good |
| | 7 | 250 | — | Bad |
| Example | 8 | 10 | 27 | Good |
| | 9 | 30 | 25 | Good |
| | 10 | 60 | 23 | Good |
| | 11 | 100 | 19 | Somewhat good |
| | 12 | 200 | 16 | Somewhat good |

Note (1):
Evaluation of productivity was carried out by comprehensively judging degree of sticking to the Banbury mixer and the rolls.
Good: No sticking occurred and operability was good.
Somewhat good: Some sticking to the kneader occurred.
Bad: Much sticking to the kneader occurred and operability was bad.

EXAMPLE 2

To 100 parts by weight of a vinyl chloride polymer comprising 20% of a gel fraction and a tetrahydrofuran-soluble fraction having an average polymerization degree of 5000 (UX-C manufactured by Sumitomo Chemical Co., Ltd.) were added 90 parts by weight of dioctyl phthalate, 3 parts by weight of a barium-zinc type stabilizer (AP-539 manufactured by Adeka Argus Co. Ltd.) and a copolyester resin (HYTREL 4057 manufactured by Toray DuPont Co.) in various amounts. The mixture was kneaded by a Banbury mixer to make pellets. Pressed sheets were prepared from the pellets and were evaluated on heat distortion, impact resilience and operability. The results are shown in Table 2.

TABLE 2

| Experiment No. | Addition amount of copolyester resin (part by weight) | Impact resilience[3] (%) | Heat distortion resistance[2] | Productivity[1] |
|---|---|---|---|---|
| 1 (Comparative Example) | 0 | 23 | Large distortion | Good |
| 2 (Comparative Example) | 2 | 25 | " | " |
| 3 (Example) | 10 | 32 | Somewhat large distortion | " |
| 4 (Example) | 30 | 35 | Slight distortion | " |
| 5 (Example) | 60 | 40 | " | " |
| 6 (Example) | 100 | 48 | " | Somewhat good |
| 7 (Example) | 200 | 50 | " | " |
| 8 (Comparative Example) | 300 | — | " | Bad |

Note:
[1] Evaluation of productivity was the same as in Table 1.
Note:
[2] Heat distortion resistance was evaluated by measuring heat distortion rate (JIS-K-6723) of the pressed products.
Note:
[3] Impact resilience was in accordance with JIS K6301.

As clear from the above results, when the copolyester resin was used in an amount of 10–200 parts by weight, good impact resilience, processability and heat distortion resistance were obtained, and they were superior especially when it was used in an amount of 30–90 parts by weight.

EXAMPLE 3

The compositions of Experiment Nos. 1 and 5 used in Example 2 were extruded into molded products having an outer diameter of 12 mmø and having an iron core of 6 mmø in the central portion through a cross die of an extruder of 50 mm.

The resulting tube-like molded products were cut to a length of 100 mm for examination of heat distortion resistance. They were kept horizontally in an oven of 160° C. under application of a load of 1 kg/100 mm for 1 hour and taken out into room temperature, and degree of distortion of the molded products after removal of the load was confirmed. The results are shown in Table 3.

TABLE 3

| Experiment No. | Heat distortion resistance |
| --- | --- |
| 1 (Comparative example) | The product was molten and the the core was exposed. |
| 5 | Substantially no distortion occurred. |

EXAMPLE 4

A copolyester resin (HYTREL 4057 manufactured by Toray DuPont Co.) was added to a composition composed of 100 parts by weight of a vinyl chloride resin containing 15% by weight of a tetrahydrofuran-insoluble gel fraction and a soluble fraction of 5000 in average polymerization degree which was prepared by the method shown in U.S. Pat. No. 4,340,530, 90 parts by weight of diisodecyl phthalate, and 3 parts by weight of a barium-zinc type stabilizer (AP-539 manufactured by Adeka Argus Co.). The mixture was kneaded by a Banbury mixer to prepare pellets. Pressed sheets were prepared from the pellets, and impact resilience and heat distortion rate of them were measured and were evaluated together with productivity. The results are shown in Table 4.

TABLE 4

| Experiment No. | Addition amount of copolyester resin (part by weight) | Impact resilience (%) Note (3) | Heat distortion resistance Note (2) | Productivity Note (1) | Matte property Note (4) |
| --- | --- | --- | --- | --- | --- |
| 1 (Comparative Example) | 0 | 23 | Large distortion | Good | Good |
| 2 (Comparative Example) | 2 | 25 | " | " | " |
| 3 (Example) | 10 | 32 | Somewhat large distortion | " | " |
| 4 (Example) | 30 | 35 | Slight distortion | " | " |
| 5 (Example) | 60 | 40 | " | " | " |
| 6 (Example) | 100 | 48 | " | Somewhat good | " |
| 7 (Example) | 200 | 50 | " | " | " |
| 8 (Comparative Example) | 300 | — | — | Bad | — |

Notes (1), (2) and (3):
Same as in Table 2 mentioned above.
Note (4):
Degree of matting was examined on extruded tapes of ø 20 mm.
Good: High matte effect.
Somewhat good: Semimatte.
Bad: Glossy As clear from the above results, when the copolyester resin was used in an amount of 10–200 parts by weight, good impact resilience, processability and heat distortion resistance were obtained, and these were especially superior when it was used in an amount of 30–100 parts by weight.

EXAMPLE 5

One hundred parts by weight of a vinyl chloride polymer containing a gel fraction in various amounts which was prepared by the method shown in U.S. Pat. No. 4,340,530, was mixed with a composition composed of 90 parts by weight of diisodecyl phthalate, 3 parts by weight of a barium-zinc type stabilizer (AP-539 manufactured by Adeka Argus Co.) and 60 parts by weight of a copolyester resin (HYTREL 4057 manufactured by Toray DuPont Co.), and the mixture was kneaded by a Banbury mixer to prepare pellets.

Pressed sheets were prepared from the pellets, and matte property and productivity of the sheets were evaluated in the same manner as in Example 4. The results are shown in Table 5.

TABLE 5

| Experiment No. | Gel content | Average polymerization degree of soluble fraction | Matte property | Productivity |
| --- | --- | --- | --- | --- |
| 9 (Comparative Example) | 0 | 1300 | Bad | Bad |
| 10 (Comparative Example) | 3.0 | 4800 | Bad | Good |
| 11 | 12.0 | 3700 | Good | Good |
| 12 | 31.0 | 2550 | Good | Good |
| 13 | 55.0 | 1890 | Good | Somewhat good |
| 14 (Comparative Example) | 91.0 | 800 | Good | Bad |

Industrial Applicability

The vinyl chloride resin composition of the present invention is industrially very useful as molding materials for tubes having heat distortion resistance and high impact resilience and matte curl cords having excellent high impact resilience.

I claim:

1. A rubbery elastic vinyl chloride resin composition having small a temperature dependence of hardness composed mainly of 100 parts by weight of a vinyl chloride resin comprising 8–90% by weight of a tetrahydrofuran-insoluble gel fraction and the remainder of a tetrahydrofuran-soluble fraction, 10–200 parts by weight of a copolyester resin and 25–200 parts by weight of a plasticizer.

2. A composition according to claim 1, wherein amount of the copolyester resin is 30–100 parts by weight.

3. A composition according to claim 1, wherein amount of the plasticizer is 40–150 parts by weight.

4. A composition according to claim 1, wherein average polymerization degree of the tetrahydrofuran-soluble fraction of the vinyl chloride resin is 400–10000.

5. A vinyl chloride resin composition according to claim 4 wherein said average polymerization degree is 1800–7000.

6. A product obtained by the forming of a rubbery elastic vinyl chloride resin composition consisting essentially of 100 parts by weight of a vinyl chloride resin comprising 8–90% by weight of a tetrahydrofuran-insoluble gel fraction and the remainder of a tetrahydrofuran-soluble fraction, 10–200 parts by weight of a copolyester resin and 25–200 parts by weight of a plasticizer, said product having a temperature dependence of hardness of no greater than 25 in the range of −20° C. to 80° C., high heat distortion resistance, and impact resilience of at least 40%, and a matte finish.

7. A product according to claim 6 wherein amount of said copolyester resin is 30–100 parts by weight, amount of said plasticizer is 40–150 parts by weight, and average polymerization degree of the tetrahydrofuran-soluble fraction of the vinyl chloride resin is 400–10000, said vinyl chloride resin being a partially cross-linked copolymer of vinyl chloride with a co-monomer selected from the group consisting of fatty acid vinyl esters, vinylidene halides, acrylic acid and alkyl esters, metharcylic acid alkyl esters, acrylonitrile, alkylvinyl ethers, styrene, ethylene, urethane and derivatives thereof.

* * * * *